INVENTOR.
PHILIP J. MAZZIOTTI

INVENTOR.
PHILIP J. MAZZIOTTI

United States Patent Office 3,331,262
Patented July 18, 1967

3,331,262
DIFFERENTIAL GEARING MECHANISM INCORPORATING THEREIN A RESILIENTLY PRELOADED CLUTCH
Philip J. Mazziotti, Toledo, Ohio, assignor to Dana Corporation, Toledo, Ohio, a corporation of Virginia
Filed Jan. 13, 1965, Ser. No. 425,272
16 Claims. (Cl. 74—711)

This invention relates to differential gearing mechanisms of the limited slip type and more particularly to such mechanisms wherein the compensating action of the gearing is retarded by a resiliently preloaded clutch means.

The conventional differential, as used today in most motor vehicles, divides the driving torque equally between both driving wheels. Accordingly, in this connection, it should be noted that a conventional differential is free to differentiate and if one wheel is incapable of transmitting any torque because of a lack of traction with the ground, no torque will be transmitted to the other wheel even if the latter has traction; under these conditions the vehicle wheel having traction will remain stationary while the vehicle wheel having no traction will be driven and rotated by the differential while transmitting no torque. It should be noted that, when the term "free to differentiate" is utilized, inadvertent friction acting upon and within the differential is being ignored. Thus, vehicles equipped with conventional differentials have definite disadvantages while being driven under adverse conditions, as when the traction of one of the vehicle wheels is limited by slippery road conditions.

Various types of limited slip or reluctant differentials have been proposed in an effort to provide that a substantial driving torque is available to both driving wheels of a motor vehicle even though one of the driving wheels has little or no traction, and still permit the mechanism some compensating action when one wheel must rotate faster than the other, as where the vehicle is making a turn. Some of these prior art structures have been provided with resiliently preloaded clutch means to inhibit or retard the free compensating action of the differential gearing. Other structures have been provided with means which utilize the axial thrust of the differential side gears or some other means responsive to the transmission of torque by the differential to load the friction clutch means. In addition to this torque responsive loading, some structures utilize resilient means in the form of coil springs between the side gears to provide a preload on the friction clutch means. In this particular case, however, this minimum preload adversely affects the normal operation and backlash of the side gears since it affects the intermeshing of the gear teeth of the differential gear train.

Other prior art structures also utilize the axial thrust of the differential side gears as a torque responsive means to load the friction clutch means as well as incorporating a resilient means for preloading the clutch means. In one such structure the clutches are provided with pressure plates which extend radially beyond the side gears and the resilient means are disposed between such pressure plate extensions and impose their acting loads simultaneously on both of the clutch means independently of the differential housing and the gear teeth of the gear train. Accordingly, the resilient means is shared by both clutch means and imposes an equal preloading force thereon.

Another prior art structure utilizes, in addition to the torque responsive means, a resiliently preloaded clutch means wherein the resilient means imposes the preload on the clutch means independently of the gear train by preloading the clutch means between a pair of spaced abutment means provided on the differential casing.

In these above referred to prior art differentials, the assembling of the clutch components into the differential housing presents a major problem. Also the manufacturing tolerances in machining the housing areas which receive the clutch components and the various cooperating parts are critical and variations therein may also cause undesirable operational characteristics.

The mechanism, as hereinafter described, among other novel features, includes preloaded clutch means which may be pre-assembled as a resiliently preloaded unit before the various components of the differential are assembled in the housing and, when assembled, provides a differential mechanism in which the differential action is frictionally inhibited so that a usable amount of torque will be transmitted to either vehicle wheel even though one of the same may have little or no traction.

Therefore, an object of this invention is to provide a differential mechanism including friction clutch means for retarding the free differential action thereof wherein the clutch means is resiliently preloaded independently of the gear housing and of the meshing engagement of the gear train and also to provide an additional load on the clutch means by means responsive to the torque being transmitted by the mechanism.

Another object of this invention is to provide a differential mechanism with clutch means for inhibiting the differentiation thereof, wherein means are provided which impose an energizing force to the clutch, independently of the differential housing.

Still a further object of this invention is to provide a differential mechanism including a pair of side gears with a constantly operating clutch means disposed between the differential housing and at least one of the side gears to inhibit spinning of a vehicle wheel which has lost its traction.

Still another object of this invention is to provide a differential mechanism including a differential housing, a gear train disposed in said housing and a pair of clutch means for inhibiting relative rotation of members of said gear train, wherein separate resilient means are provided for each of the clutch means, and each resilient means preloads the clutch means associated therewith independently of the housing, the teeth of the gear train and the other of the clutch means.

Another object of this invention is to provide such a differential as described immediately above which includes loading means responsive to the transmission of torque by the differential mechanism for imposing a load on the clutch means, which means may include a portion of the mechanism.

A further object of this invention is to provide a preloaded multiple disk clutch unit which can be quickly assembled and disassembled as a unit on a portion of the differential mechanism.

Yet a further object of this invention is to provide a differential mechanisms with a clutch unit which may be readily installed or removed from the differential gear unit simultaneously with other components of the unit.

A still further object of this invention is to provide a differential mechanism with a differentiation retarding clutch means which is of simple construction, easy and economical to manufacture yet is very durable.

Other objects and advantages of this invention will appear in the following description and appended claims, reference being had to the accompanying drawings forming a part of this specification wherein like reference characters designate corresponding parts in the several views. In the drawings:

In one embodiment of this invention a differential power transmission gear train is operatively disposed within a gear housing. A clutch means is operatively disposed on a member of the gear train and between such gear train and the housing to oppose relative rotation between members of the gear train. Resilient means independent of the meshing teeth of the gears of the power gear train and the gear housing provides an initial force on the clutch means. The gears of the gear train are meshed in a relationship to provide a component of tooth pressure for urging gears of the gear train axially outward so that a portion thereof engages the clutch means and thereby adds to the initial loading of the clutch means in response to the transmission of torque by the gear train.

Figure 1:
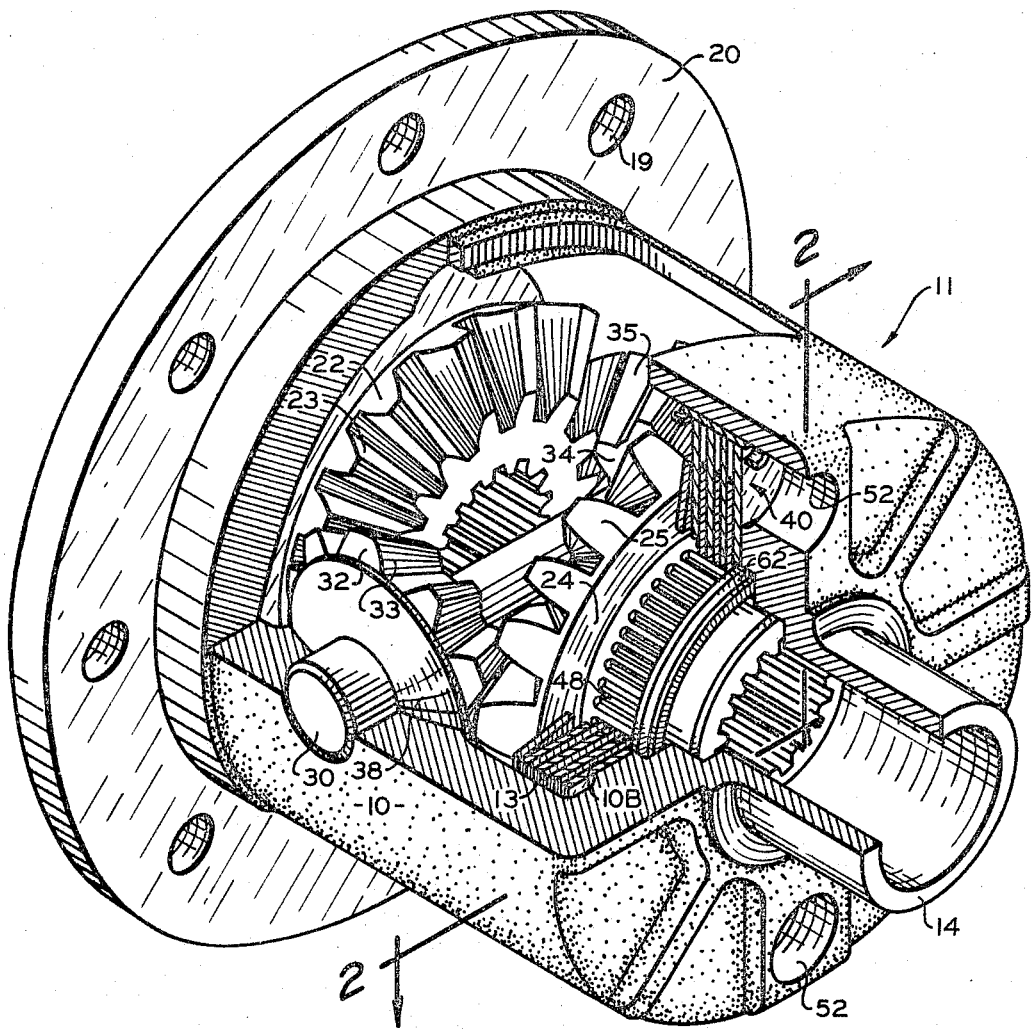
FIG. 1 is an isometric view, partially in section, showing a differential transmission embodying the preloaded clutch means of this invention.
Figure 2:
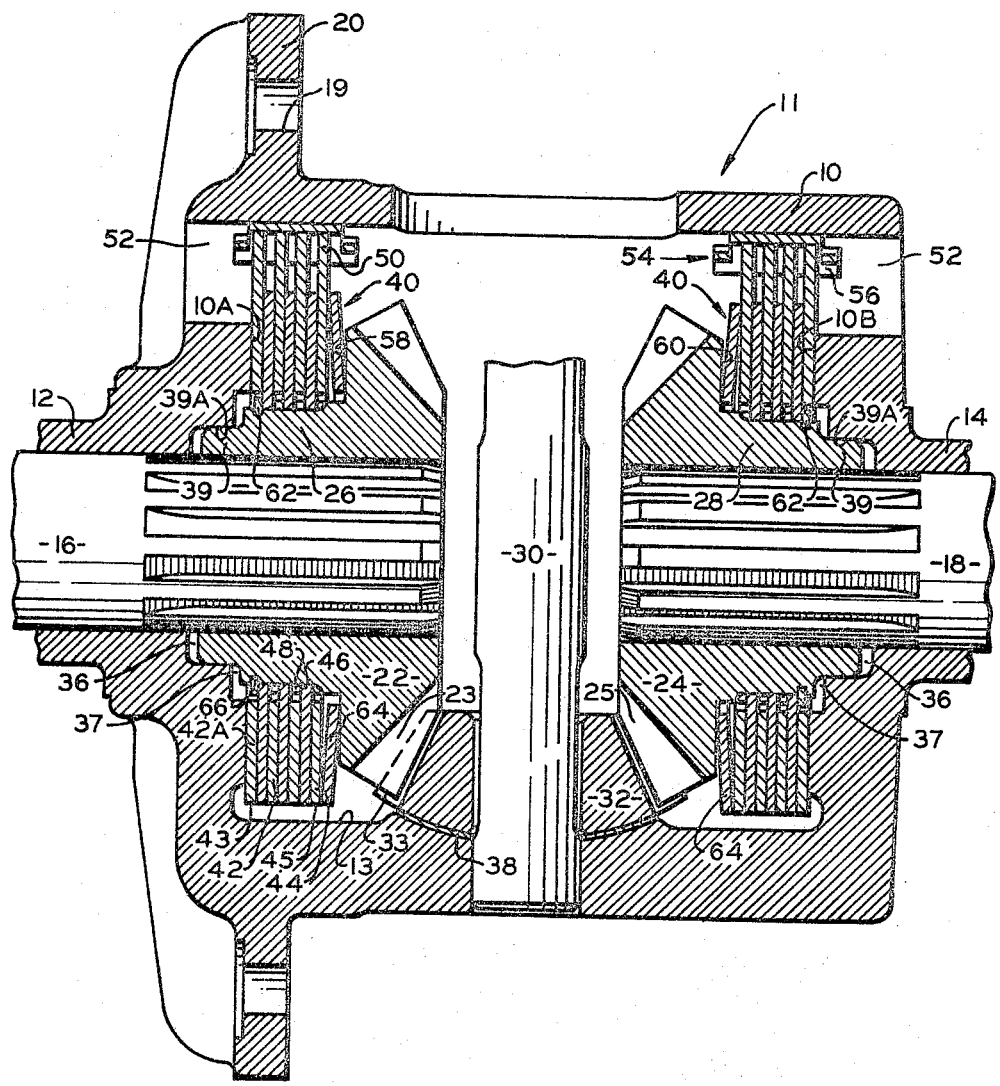
FIG. 2 is an axial sectional view of the differential transmission mechanism taken along the lines 2—2 in FIG. 1.

Referring to the drawings, particularly FIGS. 1 and 2, the housing 10 of the differential mechanism shown generally at 11 is provided with integrally formed opposed hubs 12 and 14 extending axially from the ends thereof. A pair of opposed axle or output shafts 16 and 18 have their adjacent or inner ends projecting into the hubs 12 and 14 respectively and are rotatable relative to the housing 10 and to each other. The axle shafts 16 and 18 at their outer ends are suitably connected to the driving wheels (not shown) of a vehicle equipped with the differential mechanism 11 of this invention. A conventional ring gear (not shown) is attached to a circumferential flange 20 formed on the housing 10 as by means of bolts (not shown) which are secured through apertures 19 in the flange. The ring gear is adapted to receive drive torque from a suitable source (not shown) and to drive the housing 10 about its axis of rotation. As is well known, the housing 10 is enclosed and rotatably mounted in a conventional manner within a differential casing (not shown) which carries the usual supply of lubricant for the differential mechanism 11.

Positioned within the housing 10 are axial aligned output or side gears 22 and 24 arranged in an opposed spaced-apart facing relation. The side gears 22 and 24 are provided with outwardly extending hubs 26 and 28 respectively which are internally splined to receive mating external splines on the axle shafts 16 and 18 respectively whereby the side gears are mounted on the axle shafts for unitary rotation and relative axial movement.

Extending diametrically through the housing 10 and centrally between the side gears 22 and 24 is a spider member or pin 30. The spider member 30 is of elongated substantially cylindrical configuration and rotatably carries thereon a pair of diametrically opposed compensating or pinion gears 32 and 34 adjacent its outer ends and upon the housing 10 being drivingly rotated about its axis, the member 30 drives the pinion gears to rotate unitarily with the housing about the axis of the latter.

The compensating gears 32 and 34 have teeth 33 and 35 respectively intermeshed with teeth 23 and 25 respectively of the side gears 22 and 24. These teeth 23, 25, 33 and 35 have positive pressure angles and are adapted to transmit torque between the gears 22, 24 and 32, 34 and upon such transmission of torque, the teeth acting as cams, cause the side gears 22 and 24 to be urged axially outwardly and the pinion gears 32 and 34 to be urged radially outwardly. Thrust washers 38 are inset in the housing 10 and have a contour conforming to and co-operating with the outer faces of the pinion or compensating gears 32 and 34 to limit outward movement thereof upon rotation of the gears, and annular spaces 36 and 37 are provided between each side gear and the adjacent portion of the housing 10 to permit axial outward movement of the side gears; each of the hubs 26 and 28 being provided with pilot portions 39 of reduced diameter with the pilot portions being rotatably and slid- ably received in counterbores 39A formed in the housing 10. It is noted that with the structure as above described, the side gears 22 and 24 are rotatable relative to each other and to the pinion gears 32 and 34 and that the pinion and side gears are all rotatable relative to the housing 10. Also, if any one of the gears 22, 24, 32 or 34 is inhibited from rotating relative to the housing 10 or relative to another of the gears, the differential action of the entire mechanism 11 will be inhibited.

A pair of clutch assemblies or clutch packs, each being indicated generally by the numeral 40, are provided with one being disposed axially intermediate each side gear 22 and 24 and the adjacent end wall 10A and 10B respectively of the housing 10 and which assemblies are adapted to inhibit relative rotation of the members or gears 22, 24, 32 and 34 of the gear train. Although two clutch assemblies 40 are shown in the drawings, in some cases one clutch assembly will suffice inasmuch as the provision of a frictional resistance between two relatively rotating members of the differentiating differential mechanism is effective throughout the differential mechanism.

More particularly, each clutch assembly 40 includes first and second pluralities of friction members or plates 42 and 44. These members have cooperating radially extending friction surfaces thereon and are adapted to be pressed into frictional engagement and thereby provide a clutching engagement between such members. The members 44 are annular in shape and are provided with a plurality of internal splines 46 which cooperate with and are splined to peripheral splines 48 formed on the hubs 26 and 28 of the side gears 22 and 24 respectively whereby the friction surfaces of the members 44 are drivingly connected to the gear teeth 23 and 25 of the side gears. The periphery 45 of each of the members 44 is spaced from the adjacent internal wall 13 of the housing 10 and adapted to rotate relative thereto while, as the result of the above described spline connection, the members 44 are adapted to rotate unitarily with while being axially movable relative to the side gear carrying the same. Thus, it is seen that the hubs 26 and 28 constitute the carrying means for the friction members 44 of the clutch assembly 40.

The members 42 are also substantially annular in form having an internal opening which is radially spaced from hubs 26 and 28, and each are provided with a periphery 43 which is radially spaced from the internal wall 13 of the housing 10. Further the members 42 are provided with a plurality of circumferentially spaced driving means in the form of tangs 50 which extend radially from the periphery 43 thereof and register and cooperate with axially extending keyways 52 formed in the housing 10, whereby the members 42 are adapted to rotate unitarily with the housing 10 while being axially movable relative thereto; the members 42 including the tangs 50 are disposed axially intermediate the side gears 22 and 24 and the adjacent end walls 10A and 10B respectively of the housing 10.

Means 54 are provided to pilot the members 42 in the housing 10 to thereby inhibit the same from wearing upon the housing. More particularly, the housing 10 has four axially extending keyways 52 formed therein which keyways are preferably formed by drilling the same in an axial direction completely through the end walls 10A and 10B of the housing 10. The keyways are circumferentially spaced at intervals which are equal to the spacing of the tangs 50 and are spaced radially outward a sufficient amount so that each of the keyways intersects the bores of the housing and has a cross-section configuration at such intersection which is substantially semicircular and has a diameter sufficiently large so as to be spaced from the tangs 50 received therein. The tangs 50, as shown, are also of semicircular configuration. Each pilot means 54 has an axial elongated outer portion 56 which is received in the keyways 52 aligned therewith, the outer portion 56 being semicircular in cross-section and having an outer periphery that cooperatively conforms to and slidably engages the keyways 52 receiving the same and an inner periphery which cooperatively conforms to and slidably engages the tangs 50 of the plates 42. Accordingly, the pilot means 54 are drivingly and pilotingly interposed between the housing 10 and the tangs 50 in a wear-resisting relationship and are connected to the housing 10 for unitary rotation therewith while being axially slidable relative thereto.

Preferably, each clutch assembly 40 includes at least a pair of the members 42 at the opposed axial sides thereof with a member 44 interleaved therebetween; however, greater numbers of the members 42 and 44 may be utilized and, as shown herein, four members 42 are interleaved with four members 44. As shown, each member 42 has two equally spaced tangs 50 with each tang being disposed in the axially extending keyway 52, so that there are four axially aligned tangs 50 in each keyway 52. It is understood that other forms of drive means besides tangs may be utilized and that other members of tangs 50 may be provided on the members 42 cooperating with a suitable number of keyways 52.

The clutch assemblies 40 also each include axially spaced abutting means; which abutting means comprise portions of the differential side gears 22 and 24 and removable shoulders or snap rings 62. These abutting means are disposed axially intermediate the gear teeth 23 and 25 of the side gears 22 and 24 respectively and the walls 10A and 10B of the housing 10 respectively. More particularly, the clutch assemblies 40 are in the form of an integral clutch pack as the clutch components thereof are preassembled on the hubs 26 and 28 of side gears 22 and 24 respectively; such side gears and clutch assemblies then being insertable into the housing 10 as a preassembled unit. To this end, the abutting means includes the back faces 58 and 60 of the side gears 22 and 24 respectively and the snap rings 62. The back faces 58 and 60 and the snap rings 62 have portions which constitute axially spaced radially extending facing surfaces which surfaces are integrally connected by axially extending portions of the corresponding hubs 26 and 28. The abutting means, therefore, is secured to and carried by the hubs 26 and 28 of the side gears 22 and 24 respectively.

As shown in the arrangement of FIG. 2, the snap ring 62 engages the opposed axial outer side of a friction member 44 of a stack of friction members and thereby holds the same against either of the back faces 58 and 60 of the corresponding side gears 22 and 24; the snap ring 62 being spaced radially inwardly from the outermost member of the clutch stack, indicated at 42A. Accordingly, it is seen that the friction members 42 and 44 of the assemblies 40 are axially movable relative to the housing 10 and the abutting means is separate from the housing 10.

The clutch assemblies 40 also include resilient means for resiliently preloading the friction surfaces of the members 42 and 44; that is, the members other than member 42A which, in effect, functions as a wear plate for the faces 10A and 10B of the housing. More particularly, and referring to FIG. 2, it has been found that a resilient preload can be provided in an assembly 40 by providing a resilient washer 64 between a member 42 and the back face of the corresponding side gear. Alternatively, however, the members 42 and 44 can be deformed in such a manner that they act as the resilient washers to provide the preload. In FIG. 2, the resilient washer 64 has been provided with an inwardly facing convex dished form while the friction members 42 and 44 are merely flat faces. As noted previously, however, the friction members of the assembly 40 can also be of this dished configuration.

When the resilient washers are of the dished form as shown, they have such a configuration that they are commonly referred to as Belleville springs; however, it should be noted that other resilient washer shapes can be utilized and are considered to be within the scope of this invention. Further, various arrangements of the members 42 and 44, when they are dished, can be made so that the loads provided thereby resiliently act in series, that is, their loads are not additive; however, parallel resilient arrangements and series-parallel resilient arrangements can also be utilized merely by arranging the resilient spring washers in such orders and by properly selecting the load, size and frictional characteristics desired.

In order to complete the clutch assembly, the resilient washer 64, as shown in FIG. 2, is compressed substantially flat after the other components of the clutch have been assembled on a side gear and the snap ring 62 is then placed in a groove 66 provided in the hub of the side gear. In the assembled condition, the resilient washer 64 is substantially flat and thus, it provides a resilient load on the adjoining cooperating surfaces of the friction members 42 and 44. The preloaded clutch and side gear assemblies can now be assembled as a unit into the differential housing 10 merely by inserting such assemblies into the same.

The teeth 23 and 25 of the side gears 22 and 24 and the teeth 33 and 35 of the pinion gears 32 and 34 intermeshed therewith are preferably formed with positive pressure angles so that upon the transmission of torque between the intermeshed teeth, the same urge the axially spaced back faces 58 and 60 of the side gears 22 and 24 respectively, which act as pressure plates, axially outwardly to press against the assemblies 40 interposed axially intermediate the same and the adjoining surfaces 10A and 10B of the housing 10, thereby imposing an engaging load on the friction surfaces of the members 42 and 44. It is seen, then, that the teeth 23 and 25 of the side gear 22 and 24 respectively not only are operatively connected to the pinion gears to transmit torque therefrom to the axle shafts 16 and 18 respectively, but are also operatively connected to the back face portions 58 and 60 of the side gears and function to urge the same axially outwardly to engage the clutch assemblies 40 by compressing the assemblies against the surfaces 10A and 10B of the housing 10.

Figure 3:
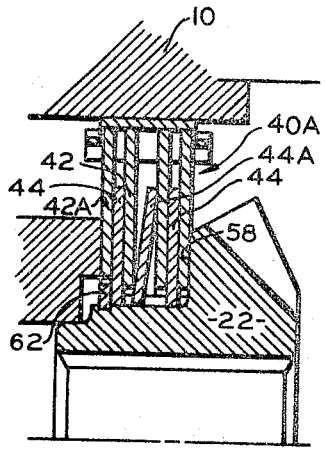
FIGS. 3, 4, 5, 6 and 7 are fragmentary sectional views of the resiliently preloaded clutch means of this invention showing various arrangements of the elements thereof.

In FIGS. 3 through 7 other clutch arrangements are shown which incorporate the features of this invention. In FIG. 3, which utilizes a plate member 42A as shown in FIG. 2, the snap ring 62 engages the outer portion of the outer plate 44 and holds the clutch stack 40A in a compressed relationship. In this embodiment the center member 44A has been formed with an axially deformed or dished configuration and functions as a resilient washer; such member 44A having been shown in an out of flat condition for illustration purposes when such in the actual assembly would in reality be compressed substantially flat. Accordingly, with the members 42, 44 and 44A compressed substantially flat against the back face 58 of the side gear 22, the member 44A will not only function as a friction member, but will also impose a resilient preload in the clutch stack 40A.

Figure 4:
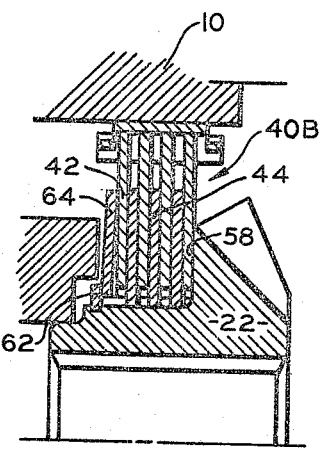

FIG. 4 shows another modification of the clutch stack of FIG. 2 wherein the resilient washer 64 is disposed on the left side of the clutch stack 40B and is dished so as to be facing convexly outwardly. Accordingly, when the members 42 and 44 and the washer 64 are compressed substantially flat against the back face 58 of the side gear 22 and the snap ring 62 inserted in its position, the clutch pack 40B will be resiliently preloaded between the snap ring and the face 58. As with the previously described embodiments, the spring washer 64 is shown out of its flat condition to emphasize its spring characteristics. Further, the washer 64 can be internally splined to the hub 26 of the side gear 22 and thus also function as a friction member.

Figure 5:
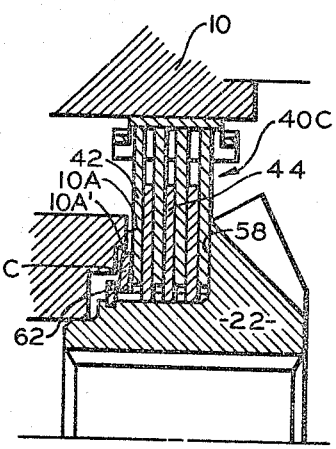

FIG. 5 discloses a modification of FIG. 4 wherein a spring washer 64C is of a reduced radial dimenison while being disposed between the snap ring 62 and the rest of the clutch pack 40C thereby preloading the members 42 and 44 against the back face 58 of the side gear 22. A counterbore 10A' is formed in the face 10A of the housing 10 and is adapted to receive the spring washer 64C so that upon the side gear 22 moving axially outwardly, the members 42 and 44 are compressed between the faces 58 and 10A separately from the resilient load imposed on the members 42 and 44 by the spring washer 64C; the washer 64C being shown out of its substantially flat condition for purposes of ilustration.

Figure 6:
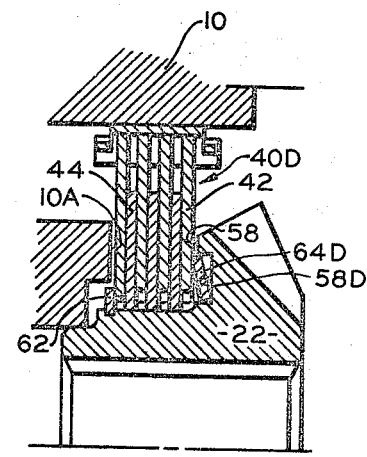

FIG. 6 is a modification of the structure shown in FIG. 5 wherein a spring washer 64D, shown out of its substantially flat condition, is disposed in a counterbore 58D formed in the face 58 of the side gear 22 and resiliently imposes a preload upon the members 42 and 44 by compressing the same against the snap ring 62. As in the embodiment of FIG. 5, upon outward movement of the side gear 22 an engaging load is imposed upon the members 42 and 44, by the face 58 pressing the members against the face 10A, which load is independent of the resilient load imposed thereon by the spring washer 64D.

Figure 7:
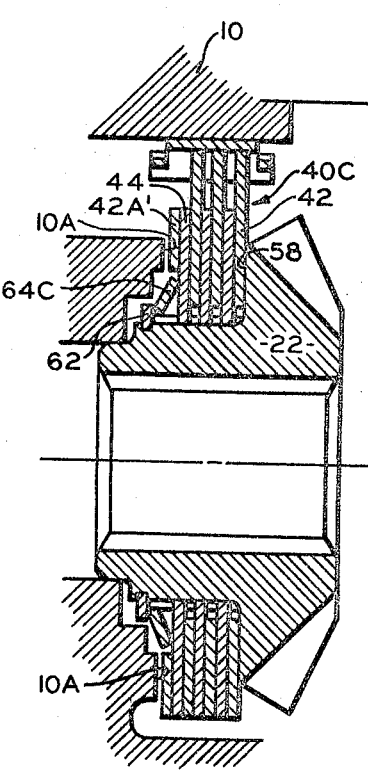

FIG. 7 discloses a structure substantially the same as that shown in FIG. 5 with the addition of an annular wear plate 42A' being interposed between the surface 10A and the clutch pack 40C to inhibit wear upon the face 10A; the plate 42A' being spaced radially inwardly from the wall 13 in the housing and receiving therein the spring washer 64C. Additionally, the member against which the spring washer 64C is directly imposing its biasing load is the outer internally splined member 44; the clutch pack having merely three members 44 and three members 42 instead of the four members 42 and three members 44 shown in FIG. 5. As with the embodiments of FIGS. 5 and 6, the engaging load caused by the side gear 22 moving axially outwardly results in the face 58 pressing the members 42 and 44 and the wear plate between the same and the face 10A independently of the resilient load impressed upon the members by the washer 64C.

It is readily apparent from the above that many different arrangements of resilient washers and friction members can be utilized within the scope of this invention. It is even contemplated that more than one or even all the members 42 and 44 may be formed as resilient washers and compressed substantially flat between the snap ring 62 and the face 58 thereby providing a resiliently preloaded clutch pack.

As shown in FIGS. 4, 5, 6 and 7, a space has been provided between the clutch assembly 40B, 40C and 40D and the end wall 10A of the housing 10; however, such has been greatly exaggerated for the purposes of illustration. It is preferred that only a relatively small spacing exists therebetween so that upon outward movement of the back faces 58 and 60 of the side gears, additive loads on the clutch pack will easily occur. It is also contemplated that an interference fit can exist between the clutch assemblies and the back faces 58 and 60 of the side gears and the adjacent end walls 10A and 10B of the housing so that the assemblies, in addition to the resilient preload, are also preloaded in a nonresilient manner between the side gears and the housing 10. However, since this latter preload will eliminate the backlash between the intermeshed gear teeth proper provision should be made therefor.

While only a single embodiment of this invention and modifications thereof have been shown and described, it is understood that such is for the purpose of illustration only and not for the purpose of limiting this invention as defined in the following claims.

What is claimed is:
1. A differential mechanism comprising in combination at least the following portions,
 (a) housing means having an axis of rotation,
 (b) compensating gear teeth means including means drivingly connecting the same to said housing for unitary rotation therewith and simultaneous rotation relative thereto,
 (c) output gear teeth means intermeshed in a driving relation with said compensating gear teeth means and rotatable relative theerto and being rotatable relative to said housing means whereby said housing means and both said teeth means are rotatable relative to each other,
 (d) at least one of said gear teeth means having carrying means drivingly connected thereto and unitarily rotatable therewith relative to the other of the aforesaid means,
 (e) a pair of abutting means disposed in said housing and secured to said carrying means in a spaced relationship and being unitarily movable therewith relative to said other of the aforesaid means,
 (f) clutch means disposed in said housing and including at least a pair of friction surface means and a resilient means for exerting a resilient load on and pressing said friction surfaces into engagement,
 (g) at least a portion of said clutch means being disposed intermediate and engaging said abutting means with the loads of said resilient means acting and reacting upon said abutting means when pressing said friction surfaces into engagement,
 (h) means securing one of said friction surface means to said carrying means for unitary rotation therewith,
 (i) and means securing another of said friction surface means to at least one of said other of the aforesaid means for unitary rotation,
 (j) whereby rotation of said one gear teeth means relative to said one of said other of the aforesaid means is frictionally inhibited and the load of said resilient means presses said friction surfaces into engagement with the action and reaction loads thereof being independent of said driving means and said gear teeth means.

2. A differential mechanism according to claim 1 including means, which includes portions of said mechanism, responsive to the transmission of torque by said mechanism and engageable with said clutch means for imposing a pressing load on said friction surface means in response to the transmission of torque by said mechanism.

3. A differential mechanism comprising in combination
 (a) compensating gear means having gear teeth,
 (b) a pair of output gear means having gear teeth intermeshed with said gear teeth of said compensating gear means, with said output gear means being rotatable relative to said compensating gear means.
 (c) driving means for transmitting driving torque to said compensating gear means whereby the latter may transmit said torque to said output gear means and including means drivingly connecting said compensating gear means to said driving means while allowing relative rotation therebetween and means rotatably mounting said output gear means to said driving means whereby said driving means, said pensating gear means and said output gear means are rotatable relative to each other,
 (d) the gear teeth of at least one of said gear means having carrying means unitarily rotatable therewith and rotatable relative to the other of said aforesaid means,
 (e) a pair of abuting means secured to said carrying means in a spaced relationship and being unitarily movable therewith,
 (f) a clutch means including at least a pair of friction surface means and a resilient means for exerting a resilient load on and pressing said friction surfaces into engagement,
 (g) at least a portion of said clutch means being disposed intermediate and engaging said abutting means with the loads of said resilient means acting and reacting upon said abutting means and pressing said friction surfaces into engagement, (h) means securing one of said friction surface means to said carrying means for unitary rotation, (i) and means securing another of said friction surface means to at least one of said other of said aforesaid means for unitary rotation, (j) whereby rotation of said one gear means relative to said one of said other aforesaid means is frictionally inhibited and the load of said resilient means presses said friction surface into engagement with the action and reaction loads thereof being independent of said driving means and said gear teeth means.

4. A differential mechanism comprising in combination at least the following portions, (a) housing means having an axis of rotation, (b) compensating gear teeth means including means drivingly connecting the same to said housing for unitary rotation therewith and rotation relative thereto, (c) output gear teeth means intermehsed in a driving relation with said compensating gear teeth means and rotatable relative thereto and being rotatable relative to said housing means whereby said housing means and said teeth means are rotatable relative to each other, (d) an integral clutch pack means adapted to be inserted in said housing means as a unit including (1) carrying means including means for drivingly connecting the same to at least one of said gear teeth means and being disposed in said housing therewith, (2) a pair of abutting means secured to said carrying means in a spaced apart relation and being unitarily movable therewith relative to said other of said aforesaid means, (3) clutch means disposed in said housing and including at least a pair of friction surface means and a resilient means for exerting a resilient load on and pressing said friction surface means into engagement, (4) at least a portion of said clutch means being disposed in the space intermediate said abutting means and engaging the same with the loads of said resilient means acting and reacting upon said abutting means and pressing said friction surfaces into engagement, (e) means securing one of said friction surface means to said carrying means for unitary rotation therewith, (f) and means securing another of said friction surface means to at least one of said other of said aforesaid means for unitary rotation therewith, (g) whereby said clutch pack means may be separately inserted in said housing means as a preloaded assembly and thereafter rotation of said one gear teeth means relative to said one of said other of said aforesaid means is frictionally inhibited and the load of said resilient means presses said friction surfaces into engagement with the action and reaction loads thereof being independent of said driving means and said gear teeth means.

5. A differential mechanism comprising in combination (a) a rotatable housing having an axis of rotation, (b) compensating gear means disposed in said housing and including means drivingly connecting the same to said housing for unitary rotation about the axis of the latter while allowing said compensating gears to rotate relative to said housing, (c) a pair of side gear means disposed within the coaxial with said housing means and rotatably mounted therein and positioned in an axially spaced opposed relation, (d) said gear means having gear teeth means thereon with said side gear teeth means being intermeshed with said compensating gear teeth means whereby said side gear means, said compensating gear means and said housing means are rotatable relative to each other, (e) carrying means disposed in said housing and coaxial with one of said gear means and being drivingly connected to said one gear means for unitary rotation therewith relative to the other of said aforementioned means, (f) a pair of abutting means secured to said carrying means and spaced axially with respect thereto and rotatable unitarily therewith, (g) a first and a second annular friction surface means positioned radially intermediate said carrying means and said housing means and axially intermediate said abutting means, (h) annular resilient means disposed radially intermediate said carrying means and said housing means and having at least a portion thereof disposed axially intermediate said abutting means along with said friction surface means, (i) said resilient means being axially deformed with respect to said carrying means and axially compressed by said abutting means thereby imposing a resilient load on said friction surface means with action and reaction forces thereof being imposed upon said abutting means, (j) means drivingly connecting said first friction surface means to said carrying means for unitary rotation therewith, (k) and means drivingly connecting said second of said friction surface means to one of the other of said aforesaid means for unitary rotation therewith, (l) whereby rotation of said carrying means and said one of said gear means relative to said one of said other of said aforesaid means is frictionally inhibited and the load of said resilient means presses said friction surface means into engagement with the action and reaction loads thereof being independent of said driving means and said gear teeth means.

6. A different mechanism according to claim 5 wherein (a) said one gear means is movable along its axis axially outwardly relative to the other of said aforesaid means, (b) said friction surfaces and said resilient means comprise a preloaded clutch means and said clutch means is disposed axially intermediate said one gear means and said housing with respect to the axis of said one gear means, (c) said gear teeth means having positive pressure angles and cooperating with a camming action when torque is being transmitted therebetween which action induces separation of said gear teeth means so that said one gear is urged axially outwardly upon the transmission of torque by said gear teeth means, (d) first and second engaging means carried respectively by said housing means and said one gear means in an axially spaced relation with respect to the axis of said one gear and disposed on axially opposed sides of said clutch means, (e) whereby upon the transmission of torque by said gear teeth means said one gear means is urged along its axis in an outward direction and compresses said clutch means between the engaging means thereon and engaging means of said housing means.

7. A differential mechanism comprising in combination at least the following portions, (a) a housing having an axis of rotation, (b) a pair of side gears disposed in said housing and rotatable coaxially relative thereto and being disposed in an axially opposed spaced relationship, (c) a pair of radially opposed compensating gears disposed axially intermediate said side gears and including means mounting the same for unitary rotation with said housing and for rotation relative thereto, (d) said gears being provided with gear teeth thereon with said side gear teeth in meshing engagement with said compensating gear teeth whereby said side gears, said compensating gears and said housing are rotatable relative to each other, (e) an axially outer annular and rigidly extending portion of said side gear being formed as first engaging surface and disposed in axially spaced relationship relative to said housing, (f) the inner surface of said housing including a radially extending second engaging surface disposed in an axially spaced relationship relative to said first engaging surface, (g) said one side gear including rub means extending axially outwardly therefrom and having at least a portion thereof disposed axially intermediate said first and second engaging surface, (h) preloaded clutch means including a plurality of annular substantially radially extending friction surface means and an annular resilient member disposed about said portion of said hub means and positioned between said engaging surfaces, (i) at least one of said friction surface means being secured to said housing for unitary rotation therewith and at least one of said friction surface means being secured to said hub means for unitary rotation, (j) said resilient member being axially deformed and adapted to be axially compressed thereby providing a resilient load upon said friction surface means, (k) and abutting means carried by said hub means and engaging the axially outer portion of said clutch means and pressing the same axially inwardly against the engaging surface of said side gear means thereby resiliently preloading said clutch means between said abutting means and said engaging surface.

8. A differential mechanism according to claim 7 wherein said one side gear is mounted for axial movement relative to said housing and said mechanism includes means, which includes portions of said mechanism responsive to the transmission of torque by said mechanism for urging said first engaging surface axially outwardly and compressing at least a portion of said clutch means between said first and second engaging surfaces and imposing a pressing load on said friction surface means in response to the transmission of torque by said mechanism.

9. A differential mechanism according to claim 8 wherein said annular resilient member engages said abutting means and pressingly engages said friction surface means against each other and against said first engaging surface of said side gear means.

10. A differential mechanism according to claim 9 wherein said second engaging surface is disposed radially outwardly from said resilient means and engages said friction surface means separately from said resilient means.

11. A differential mechanism according to claim 8 wherein said resilient means engages said first engaging surface and resiliently urges said friction surface means into engagement with each other and axially outwardly against said abutting means.

12. A differential mechanism according to claim 11 wherein a portion of said first engaging surface extends radially beyond said resilient means and engages said friction surface means independently of said resilient means.

13. A differential mechanism according to claim 8 wherein said friction surface means are carried by a plurality of annular plate members, at least one of said plate members being secured to said housing for unitary rotation therewith, at least another of said plate members being secured to said hub means for rotation therewith, and one plate member of said plurality of plate members is axially deformed and axially compressed whereby the same constitutes said resilient member and provides a resilient load upon said friction surface means.

14. A differential mechanism according to claim 8 including an annular wear plate disposed between said second engaging surface and said preloaded clutch means.

15. A differential mechanism comprising in combination
(a) a rotatable housing having an axis of rotation,
(b) a differential gear train disposed in said housing and including
(1) a pair of side gears disposed within and coaxially with said housing and rotatably mounted therein and positioned in an axially spaced opposed relationship, and
(2) a pair of compensating gears disposed in said housing axially intermediate said side gears and in meshing engagement therewith and including means mounting the same for unitary rotation with said housing and for rotation relative thereto,
(c) at least one of said side gears having a radially extending axially outer first engaging surface disposed in an axially spaced relationship with said housing and also having an axially extending hub thereon,
(d) said housing having a radially extending axially inner second engaging surface disposed in an axially spaced relationship with said first engaging surface,
(e) a first plurality of radially extending friction plate members disposed about said hub and radially spaced therefrom and including driving means engaging said housing whereby said first friction plate members rotate unitarily with said housing while being axially movable relative thereto.
(f) a second plurality of radially extending friction plate members interleaved with said first friction plate members and being disposed about said hub in a radially spaced relationship with said housing and including means drivingly connecting the same to said hub for unitary rotation and relative axial movement,
(g) said friction plate members being disposed axially intermediate said first and second engaging surfaces,
(h) a resilient spring washer member disposed about said hub and being axially deformed,
(i) shoulder means carried by the axially outer portion of said hub and engaging an axially outer portion of one of said members and compressing said members against said first engaging surface with said spring washer member being compressed substantially flat and imparting a resilient load to said friction plate members,
(j) said one side gear being axially movable relative to said housing so that upon axially outward movement thereof relative to said housing said first engaging surface axially approaches said second engaging surface and axially compresses said members disposed therebetween,
(k) the gear teeth of said side gears and compensating gears having positive pressure angles and acting as cams to urge said one side gear axially outwardly upon the transmission of torque by said gears,
(l) whereby said spring washer member imposes a resilient load on said friction plate members and said one side gear imposes a load on at least some of said friction plate members in response to the transmission of torque by said gears.

16. A differential mechanism according to claim 15 wherein
(a) the other of said side gears has a radially extending axially outer third engaging surface disposed in an axially spaced relationship with said housing and also having an axially extending hub thereon which hub extends in the opposite axial direction with respect to the hub of said one side gear,
(b) said housing having a radially extending inner fourth engaging surface disposed in an axially spaced relationship with said third engaging surface,
(c) a third plurality of radially extending friction plate members disposed about said hub of said other side gear and radially spaced therefrom and including driving means engaging said housing whereby said third friction plate members rotate unitarily with said housing while being axially movable relative thereto, (d) a fourth plurality of radially extending friction plate members interleaved with said third plurality of plate members and disposed about said hub of said other side gear and interleaved with said third friction disk members and being in a radially spaced relationship with said housing and including means drivingly connecting the same to said hub of said other side gear for unitary rotation and relative axial movement, (e) said third and fourth pluralities of friction plate members being disposed axially intermediate said third and fourth engaging surfaces, (f) a resilient spring washer member disposed about said hub of said other side gear and being axially deformed, (g) shoulder means carried by the axially outer portion of said other side gear hub and engaging an axially outer portion of one of said members carried thereby and compressing said members against said third engaging surface with said spring washer member being compressed substantially flat and imparting a resilient load to said friction plate members, (h) said other side gear being axially movable relative to said housing so that upon axially outward movement thereof relative to said housing said third engaging surface axially approaches said fourth engaging surface and axially compresses said third and fourth pluralities of members disposed therebetween (i) said other side gear, as well as said one side gear being urged axially outwardly upon the transmission of torque by said gears, (j) whereby both said spring washer members impose a resilient load on said friction plate members associated therewith independent of each other and with the action and reaction loads of said spring washer members acting solely upon said friction plate members and said side gears and being independent of said housing, and said side gears impose a load on at least some of said friction plate members in response to the transmission of torque by said gears.

References Cited

UNITED STATES PATENTS

| | | | |
|---|---|---|---|
| 1,750,981 | 3/1930 | Wildhaber | 74—711 |
| 1,883,725 | 10/1932 | Guilmette | 74—711 |
| 2,930,256 | 3/1960 | Wildhaber | 74—711 |
| 2,966,076 | 12/1960 | O'Brien | 74—711 |

FOREIGN PATENTS

| | | |
|---|---|---|
| 237,133 | 1/1962 | Australia. |
| 1,302,284 | 7/1962 | France. |

FRED C. MATTERN, Jr., *Primary Examiner.*

DAVID J. WILLIAMOWSKY, *Examiner.*

J. A. WONG, *Assistant Examiner.*